United States Patent [19]
Curran et al.

[11] Patent Number: 5,802,099
[45] Date of Patent: Sep. 1, 1998

[54] METHOD FOR MEASURING SUBSTRATE TEMPERATURE IN RADIANT HEATED REACTORS

[75] Inventors: William J. Curran, Saratoga; Gary M. Moore, Monte Sereno, both of Calif.

[73] Assignee: Moore Epitaxial, Inc., San Jose, Calif.

[21] Appl. No.: 703,230

[22] Filed: Aug. 26, 1996

[51] Int. Cl.$^6$ .................................................. G01J 5/00
[52] U.S. Cl. ........................................ 374/131; 374/126
[58] Field of Search .................................. 374/120, 121, 374/126, 130, 131, 132, 141; 364/557

[56] References Cited

U.S. PATENT DOCUMENTS

| | | | |
|---|---|---|---|
| 4,144,758 | 3/1979 | Roney | 374/132 |
| 4,854,727 | 8/1989 | Pecot et al. | 374/121 |
| 4,896,281 | 1/1990 | Mack | 374/121 |
| 5,154,512 | 10/1992 | Schietinger et al. | 374/131 |
| 5,213,985 | 5/1993 | Sandroff et al. | 374/131 |
| 5,226,732 | 7/1993 | Nakos et al. | 374/126 |
| 5,249,142 | 9/1993 | Shirakawa et al. | 374/132 |
| 5,305,417 | 4/1994 | Najm et al. | 374/126 |
| 5,442,727 | 8/1995 | Fiory | 374/126 |
| 5,501,637 | 3/1996 | Duncan et al. | 374/126 |

*Primary Examiner*—G. Bradley Bennett
*Attorney, Agent, or Firm*—Skjerven, Morrill, MacPherson, Franklin & Friel, LLP; Forrest E. Gunnison; Omkar K. Suryadevara

[57] ABSTRACT

The heat energy in a reactor used to process substrates is controlled to allow a more accurate measurement of the substrate temperature. The method of substrate temperature measurement is applicable to any reactor geometry and any type of heat source. Further, the method does not affect the process and so the performance of the reactor is unaffected when the substrate temperature measurement method is utilized. At a first predetermined time t1 during the process cycle, power to the heat source is turned off. At a second predetermined time t2, i.e., at the end of a time interval after the power is turned off, the heat energy from the reactor is measured for a predefined time interval, i.e., from second predetermined time t2 to a third predetermined time t3. After the measurement, i.e., at a fourth predetermined time t4, the power to the heat source is turned-on again and the process cycle continues. The time window over which the power is turned-off, i.e., the time between the first and fourth predetermined times, is small relative to the heat cycle in the particular process. Consequently, the process is unaffected by the brief interruption in heating. However, during the brief interruption, the only contribution to the heat energy in the reactor is from the substrate and other black body radiation.

30 Claims, 7 Drawing Sheets

METHOD FOR MEASURING SUBSTRATE TEMPERATURE IN RADIANT HEATED REACTORS

BACKGROUND OF THE INVENTION

1. Field of the Invention

This invention relates generally to semiconductor processing, and more specifically to measuring substrate temperature during processing.

2. Description of Related Art

Deposition of a film on the surface of a semiconductor substrate, or other substrate is a common step in semiconductor processing and in flat panel display processing. Typically, selected chemical gases are mixed in a deposition chamber containing a semiconductor substrate. Usually, heat is applied to drive the chemical reaction of the gases in the chamber and to heat the surface of the substrate on which the film is deposited, or grown.

In deposition processes, it is desirable to maximize substrate throughput, i.e., the number of substrates processed per unit time, while depositing uniform film layers. Typically, to obtain uniform film layers, it is important to maintain the substrate at a uniform temperature which in turn requires measuring the substrate temperature. Also, it is important to assure that each substrate and each substrate in a batch of substrates are processed at the same temperature. Herein, a batch of substrates refers to substrates processed at the same time, and can be either a single substrate or a plurality of substrates.

A number of different deposition reactors that utilize a radiant heat source have been developed. Generally, each deposition reactor has a reaction chamber, a substrate handling system, a radiant heat source and temperature control, and a gas delivery system (inlet, exhaust, flow control).

FIG. 1A is a simplified cross-sectional view of one type of prior art radiant heated deposition reactor 100, known as a horizontal furnace, in which susceptor 101 was positioned in horizontal tube 102 (usually of rectangular cross-section), the interior of which is the reaction chamber. Substrates, e.g., semiconductor wafers 103A to 103C, were mounted on surface 101A of susceptor 101. Radiant heat source 104 heated wafers 103A to 103C, and reactant gases 105 were flowed through tube 102 past semiconductor wafers 103A to 103C. Susceptor 101 was often tilted and not rotated, as shown in FIG. 1A, so that surface 101A faced into the flow of reactant gases 105 to minimize the problem of reactant depletion in the vicinity of the wafers near the end of the flow of reactant gases 105.

FIG. 1B is a simplified orthogonal view of another type of prior art reactor 110, known as a barrel reactor, in which susceptor 111 was suspended in an interior volume of a bell jar (not shown) which defined the reaction chamber. Substrates, e.g., semiconductor wafers 113, were mounted substantially vertically on the sides, e.g., side 111A, of susceptor 111. Radiant heat source 114, that was mounted about the exterior of the bell jar, heated wafers 113 and susceptor 111.

In one barrel reactor, radiant heat source 114 was divided into eight zones, with each zone being controlled to heat a particular region of reactor 110. When radiant heat source 114 established a substantially uniform temperature across each of semiconductor wafers 113, reactant gases were introduced through gas inlet 115 into the top of the bell jar. The gases passed down the length of susceptor 111, over the surfaces of the wafers, and were exhausted from the reaction chamber through a gas outlet (not shown) at the bottom of the bell jar.

FIG. 1C is a simplified cross-sectional view of yet another type of prior art conventional chemical vapor deposition reactor 120, known as a pancake reactor, in which vertically fixed susceptor 121 was supported from the bottom of bell jar 122 which defined the reaction chamber. Semiconductor substrates, e.g., wafer 123, were mounted horizontally on surface 121A of susceptor 121. The wafers were heated by a radiant heat source (not shown), and reactant gases were introduced into the reaction chamber above the wafers through susceptor support 125. Alternatively, a RF heat source was sometimes used and not a radiant heat source. The gases flowed down over the wafers and were exhausted through a gas outlet (not shown) at the bottom of bell jar 122.

In contrast to the reactors illustrated in FIGS. 1A to 1C that have typical process cycles of over an hour, rapid thermal process (RTP) reactors typically require only 2 to 15 minutes to process a substrate. Thus, rapid thermal reactors are characterized by a process cycle time that is significantly less that the process cycle time for a conventional reactor. FIG. 2A is a simplified cross-sectional view of an RTP reactor 200 for processing a multiplicity of substrates 210. Substrates 210 were mounted on susceptor 201 supported by susceptor support 212. Susceptor position control 202 rotated wafers 210 during processing and raised and lowered susceptor 201 to various positions for loading and processing of wafers 210. Heat control 203 controlled a single heat source 204 that heated wafers 210 to a substantially uniform temperature during processing. Gas flow control 205 regulated flow of gases into reaction chamber 209 of reactor 200 through inlet channel 206 and gas injection head 207 and exhausted gases from reaction chamber 209 through outlet channel 208.

FIG. 2B is a simplified cross-sectional view of another RTP reactor 220. As in FIG. 2A, reactor 220 includes a susceptor 201, susceptor support 212, susceptor position control 202, heat control 203, heat source 204, gas flow control 205, inlet and outlet channels 206 and 208, gas injection head 207 and reaction chamber 209. Reactor 220 also included a second heat source 224 that was also controlled by heat control 203.

FIG. 3 is a representation of a configuration for measuring substrate temperature in any one of the radiant heated reactors described above. A pyrometer 375 measures heat energy 350 exiting from reaction chamber 305. When pyrometer 375 views heat energy from a substrate 210A, i.e., substrate 210A is in the field of view of pyrometer 375, heat energy 350 primarily includes two components, i.e., a reflected component 331 from heat source 204 and a component 311 that is emitted by substrate 310A. In some configurations, it is possible that heat energy 350 could also include a component that is emitted directly by heat source 204.

As susceptor 201 rotates, there are periods during the rotation when one of the multiple substrates supported by susceptor 201 is not completely within the field of view of pyrometer 375 and so pyrometer 375 also measures black body radiation from susceptor 201. Notice that if susceptor 201 supports only a single substrate that is centered on susceptor 201, only the substrate surface is within the filed of view of pyrometer 375.

Thus, for susceptors that support multiple substrates, the source of heat energy 350 varies from a substrate to the susceptor as the susceptor rotates. The variation in the pyrometer output signal is sufficient to identify when only a substrate is the field of view of the pyrometer.

As is known to those skilled in the art, radiant heat energy 311 emitted by substrate 210A is a measure of the temperature of substrate 210A. However, to the extent that heat energy 350 includes any component that is generated directly by heat source 204, either a reflected component, or a direct component, the use of heat energy 350 to determine the temperature of substrate 210A is imprecise. Further, in most configurations, the black body radiation from the susceptor must be accounted for so that a close approximation to the substrate temperature can be obtained.

Consequently, measuring heat energy 350 to determine the temperature of substrate 210A is at best an estimate. Pyrometer 375 typically is positioned so that primarily black body radiation from the substrates is measured. This gives the best approximation to the actual temperature in the reactor. Nevertheless, such measurements usually still include some contribution that is reflected from the radiant heat source. However, with the exception of techniques that utilize a thermocouple, a substrate temperature measurement method that is applicable in all geometries and configurations for a variety of radiant heated reactors and RF heated reactors, to the best knowledge of the inventors, is not currently available.

SUMMARY OF THE INVENTION

According to the principles of this invention, in a reactor used to process substrates, the heat energy incident on a heat energy measuring device is controlled to allow a more accurate measurement of the substrate temperature than was previously possible. The method is applicable to any reactor geometry and any type of heat source. Further, the method does not affect the process and so the performance of the reactor, as measured by the quality of films produced, is unaffected when the novel substrate temperature measurement method is utilized.

In one embodiment, power is applied to a heat source of a heated substrate processing reactor, and a substrate in the heated process reactor is heated. During the process cycle, substantially all heat energy from the heat source is eliminated from heat energy detected by a heat energy measuring device for a predefined time period, where the predefined time period is short relative to the time period for the process cycle. Thus, during the predefined time period, heat energy incident on the heat energy measuring device is controlled to select heat energy from the substrate. The heat energy from the substrate is measured during at least a portion of the predefined time period with the heat energy measuring device to determine a temperature of the substrate.

In one embodiment, substantially all the heat energy from the heat source is eliminated during the predefined period by terminating power to the heat source for the predefined time period during processing of the substrate. In another embodiment, substantially all the heat energy from the heat source is eliminated during the predefined period by reducing power to the heat source for the predefined time period during processing of the substrate. In either embodiment, power is reapplied to the heat source upon completion of the predefined time period so that the process cycle continues.

This method is utilized in both a rapid thermal process reactor and a barrel reactor, sometimes called a CVD (chemical vapor deposition) reactor. In general, the method can be used for both a reactor that processes single substrate batches and a reactor that processes multiple substrate batches.

In one embodiment, at a first predetermined time t1 during the process cycle, power to the heat source is turned off, or alternatively reduced to a predefined level. At a second predetermined time t2, i.e., at the end of a time interval after the power is turned off or reduced, the heat energy from the reactor is measured for a predefined time interval, i.e., from second predetermined time t2 to a third predetermined time t3. After the measurement, i.e., at a fourth predetermined time t4, the power to the heat source is restored and the process cycle continues.

The time window over which the power is turned-off or reduced, i.e., the time between the first and fourth predetermined times, is small relative to the heat cycle in the particular process. Consequently, the process is unaffected by the brief interruption in heating.

However, during the brief interruption, the only contribution to the heat energy in the reactor is from the substrate and other black body radiation. The temperature measurement is made so that the contribution from the substrate or substrates can be determined. Consequently, the temperature measurement is no longer distorted by a contribution from the heat source itself. Therefore, the temperature measurement is a reliable indication of the substrate temperature.

In another embodiment, power to the heat source would not be interrupted, but a shutter mechanism would be used to define the time period when radiation from the substrate and other black body radiation is detected by the pyrometer. The important aspect is that the contribution from the heat source itself is either completely eliminated or minimized to the extent that the contribution does not affect the substrate temperature measurement.

As indicated above, the method of this invention is useful in any CVD reactor for any CVD process. In particular, this method is useful in both a barrel reactor and a RTP reactor to measure the substrate temperature, for example, during an epitaxial deposition. Further, the method can be used for both a radiant heat source and a radio frequency heat source. The temperature measurement process of this invention introduces no measurable slip or other defects.

DETAILED DESCRIPTION

According to the principles of this invention, a novel method for measuring substrate temperature in a heated substrate processing reactor eliminates the problems of prior art methods that included a contribution to the measured heat energy from the heat source, e.g., a radiant energy heat source. The heat energy from the substrate is measured in a time interval, i.e., a portion of a predefined time period, during which there is substantially no contribution from the heat source. Consequently, the method of this invention provides a more accurate temperature measurement, and does not affect the process being performed in the reactor. Thus, the quality of films deposited or grown on the substrate is not affected by the temperature measurement.

Figure 4B:
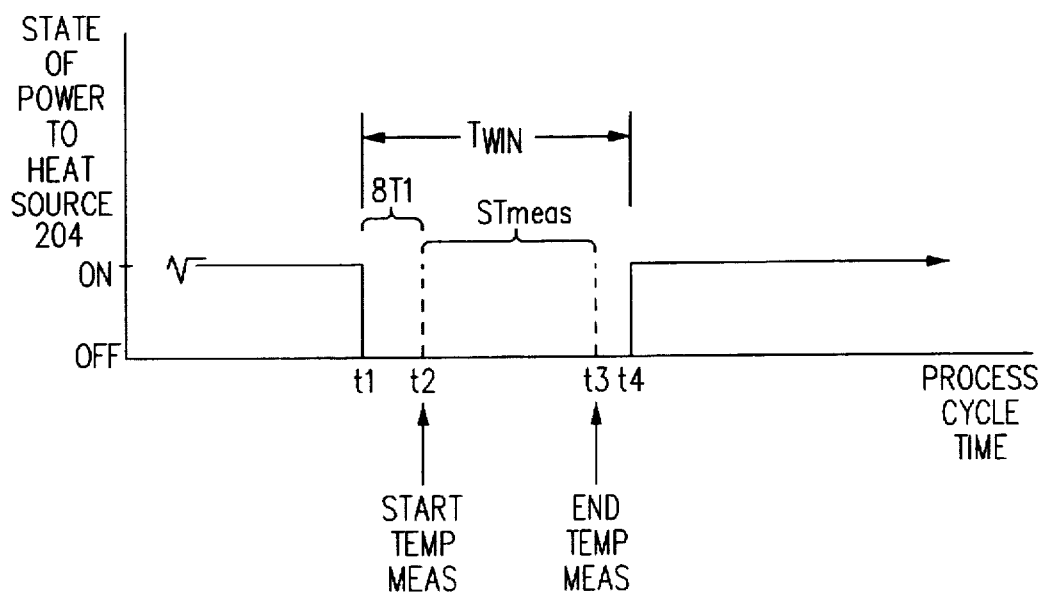
FIG. 4B is a time line for the novel substrate temperature method of this invention.
Figure 4A:
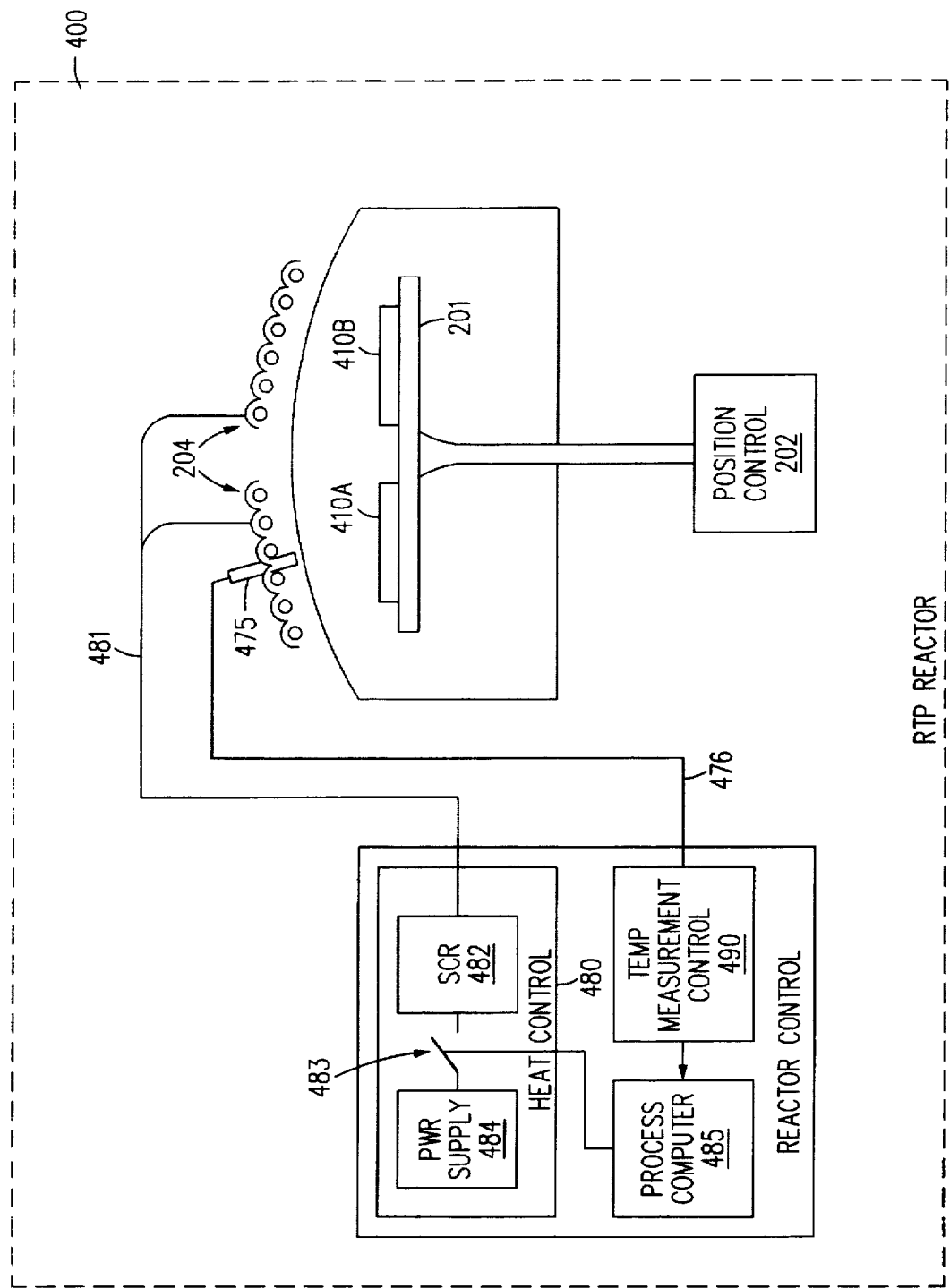
FIG. 4A is a simplified diagram of an RTP reactor in which the novel substrate temperature method of this invention is implemented.

FIG. 4A is a representative configuration of one embodiment for measuring the temperature of substrates 410A and 410B, where pyrometer 475 and the reactor geometry are such that a surface of a substrate, e.g., substrate 410A, on a surface of susceptor 201 are within a field of view of pyrometer 475 as susceptor 201 rotates. The particular geometrical configuration used is similar to that in prior art measurements, but control of pyrometer 475 and radiant heat source 204 are modified according to the principles of this invention. In particular, contributions to the heat energy measured by pyrometer 475 are controlled so that direct and/or reflected heat energy from the heat source are substantially eliminated. As used herein, substantially eliminated means that the contribution to the heat energy measured by the pyrometer from the heat source is reduced to the point that the contribution does not affect the substrate temperature measurement.

Thus, the principles of this invention are directly applicable to all reactors where substrate temperature is measured using a device, such as a pyrometer, that receives heat energy from either both a substrate and a susceptor as the susceptor rotates or only a substrate as the susceptor rotates. For example, while a RTP reactor is illustrated in FIG. 4A, the principles of this invention apply directly to reactors 110 and 120 also. Another embodiment, as described more completely below, uses the principles of this invention for a configuration where the pyrometer views only the substrate.

Each radiant heated reactor 400 includes a heat source controller 480 that provides power on a power supply line 481 to radiant heat source 204. Typically, radiant heat source 204 is a plurality of lamps, or in some reactors, a plurality of lamp banks, and so supply line 481 represents the line or lines from the heat source controller to each of the plurality of lamps or lamp banks. Further, radiant heat source 204 can have a plurality of heat zones.

Also, pyrometer 475 has a signal output line 476 that provides a signal, e.g., a temperature, representative of the heat energy incident on pyrometer 475 to substrate temperature measurement controller 490. One pyrometer system suitable for use in this invention is available from IRCON, INC., 7300 North Natchez Ave., Niles, Ill. under part no. DNFFB-13C. This system includes a twenty-four volt DC InfraRail Electronics Module; a type F sensor head assembly; a twelve inch DC interconnect cable from the sensor head to the electronics module; a reimaging focusable lens assembly with a six inch to ten inch range; and a ten foot fiber optic cable for connecting the reimaging lens assembly to the sensor head. See for example, U.S. Pat. Nos. 4,919, 505, and 5,011,296, each of which is incorporated herein by reference in its entirety.

In this embodiment, a processor module has the characteristics given in Table 1.

TABLE 1

| Processor Module Specification | |
|---|---|
| Response time: | 0.01 to 10 seconds, adjustable |
| Emissivity Control: | 0.10 to 0.11 in 0.01 increments |
| Peak-Picker Decay Rate | 0.01% to 5.0% of span/sec, adjustable |
| Analog Output | two-wire, 4 to 20 mA DC linear with temperature |
| Power requirements | 24 Volts DC |

The sensor head assembly is a miniature fiber optic sensor with a stainless steel housing, and is suitable for use in the environment surrounding a CVD reaction chamber. A suitable sensor head assembly and reimaging lens has characteristics similar to those given in Table 2.

TABLE 2

| Temperature range | 700 to 2000° C. |
|---|---|
| Spectral response | 0.7 to 1.0 micron |
| Spot Detection Size | Distance from substrate to focusable reimaging lens assembly divided by 60. |

Typically, substrate temperature measurement controller 490 provides a feedback signal to heat controller 480 through process computer 485 as both controllers 480 and 490 are under the control of process computer 485.

According to the principles of this invention, the power on power supply line 481 from heat controller 480 to radiant heat source 204 is gated so that power is selectively provided to radiant heat source 204. In this embodiment, the gating control is a switch 483 in each electrical supply line to a silicon controlled rectifier 482 that in turn drives a portion of radiant heat source 204. Herein, switch 483 represents each switch in the electrical power supply line so that when switch 483 is opened, power to SCR 482 from power supply 484 is interrupted, but the SCR setting is unchanged.

Figure 4C:
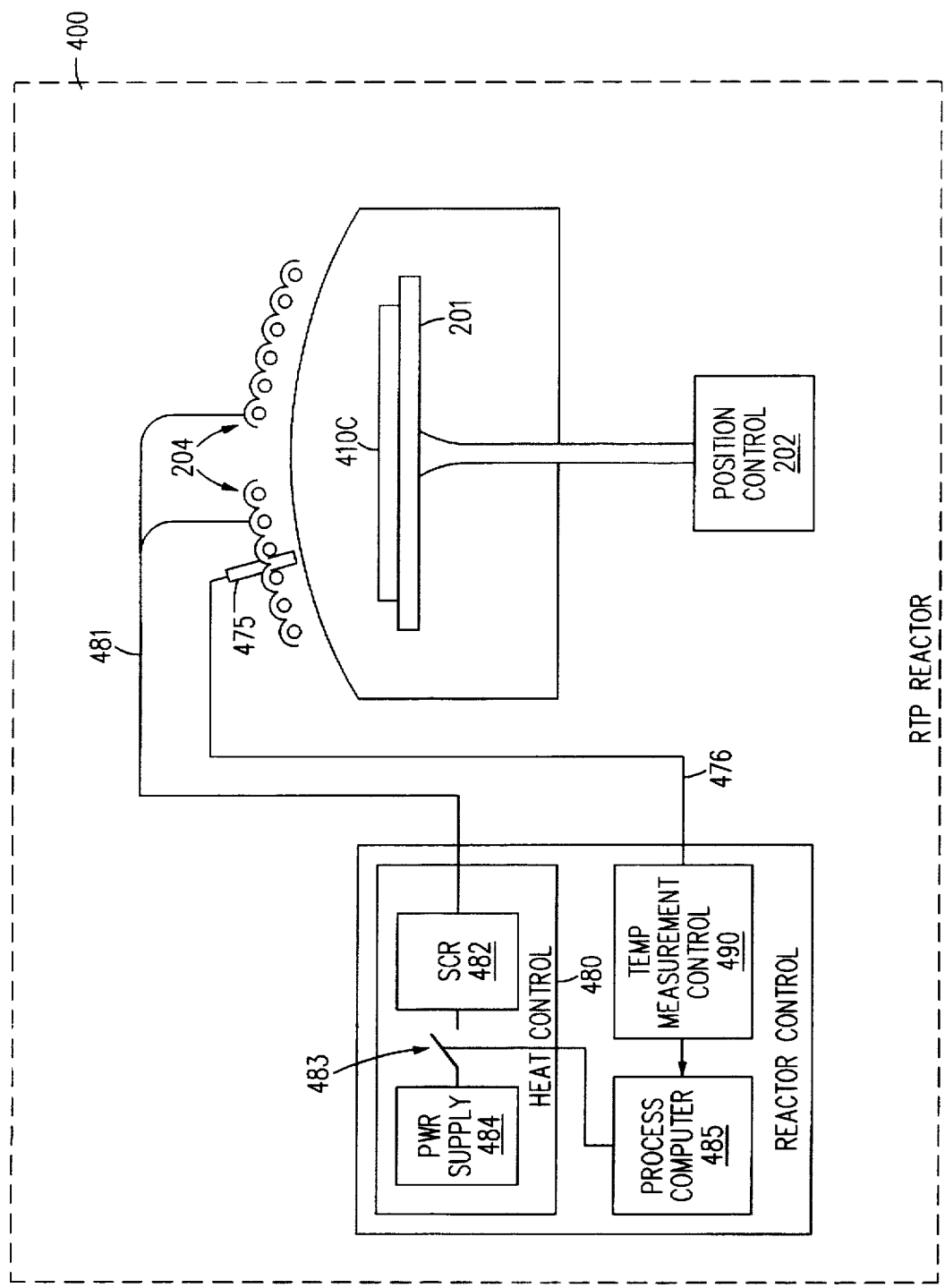
FIG. 4C is a simplified diagram of another RTP reactor in which the novel substrate temperature method of this invention is implemented.
Figure 4D:
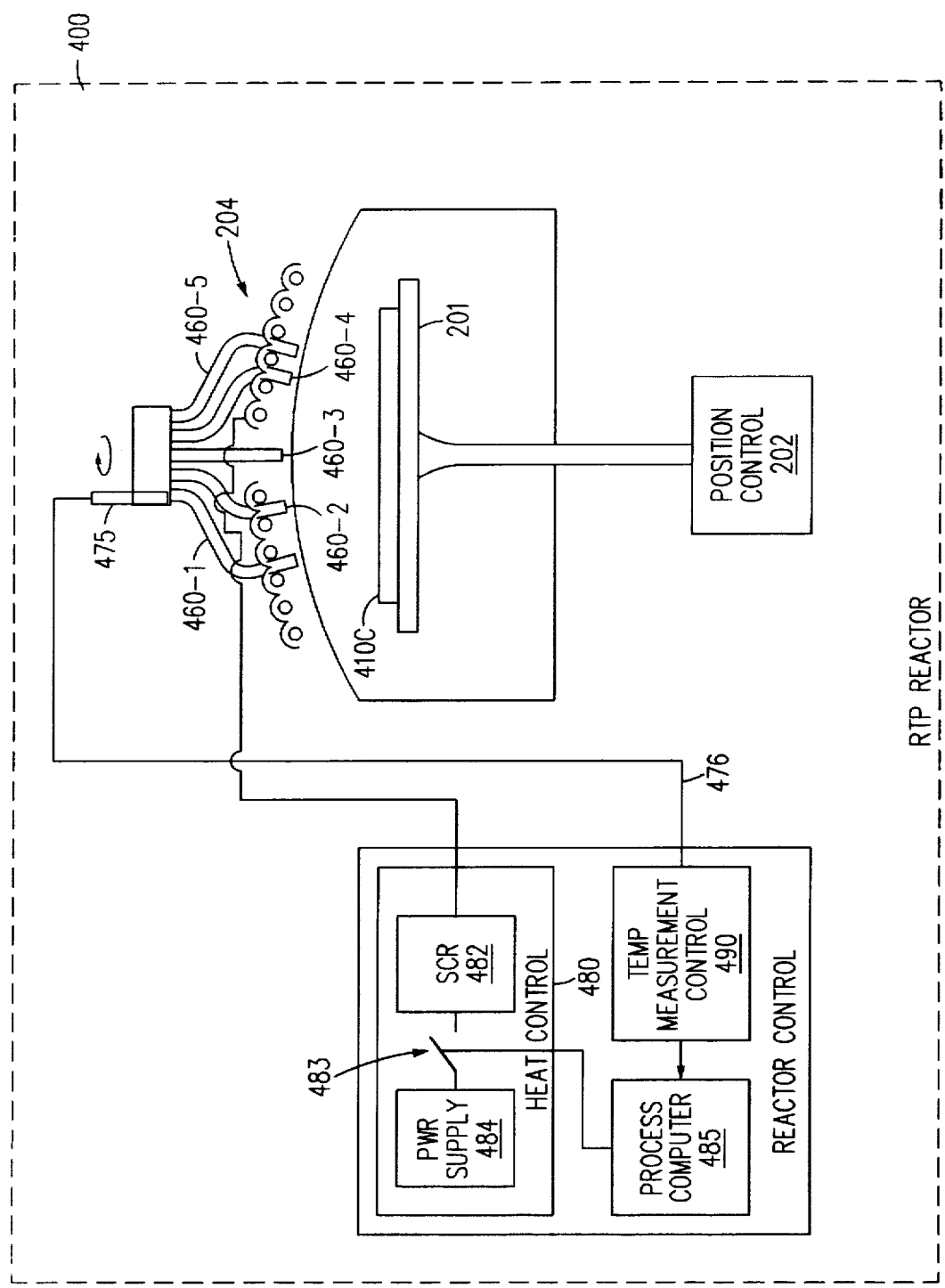
FIG. 4D is a simplified diagram of the another RTP reactor in which another embodiment of the novel substrate temperature method of this invention is implemented.

Alternatively, rather than gating the power, a shutter assembly could be used to gate the radiation to the pyrometer. Further, the configurations shown in FIGS. 4A, 4C and 4D are illustrative only and are not intended to limit the invention to such configurations. Those of skill in the art will appreciate that the power on line 481 can be controlled in a wide variety of ways. For example, rather than interrupting power, the power could be reduced, i.e., adjusted from the normal level for substrate processing to a lower level, so that there is still current flow through radiant heat source 204, but the current flow is not sufficient to cause radiant heat source 204 to generate measurable radiant heat energy.

In this embodiment, switch 481 is opened over a time window Tw that extends from time t1 to time t4 (FIG. 4B) for measurement of the substrate temperature during processing of the substrate. One criterion for selecting time window Tw is that the window must be large enough to allow making the temperature measurement after the filaments in the lamps that make up radiant heat source 204 cool enough not to radiate, but not so long that the filaments cool to the point that when power is reapplied, thermal shock to the filaments is an issue. Another criterion is that time window Tw is small enough that the process performed by reactor 400 is unaffected by the power interruption, e.g., the result of the substrate processing is substantially the same as the result of the substrate processing when the temperature measurement process of this invention is not utilized. For example, for an epitaxial deposition, time window Tw is selected so that the process of this invention introduces less than a one percent change in the resistivity of the epitaxial layer.

To initiate a substrate temperature measurement, power to radiant heat source 204 is turned off at time t1 by opening switch 483. Radiant heat source 204 does not instantaneously shut off, but rather, radiant heat source 204 cools down. At time t2, temperature measurement controller 490 is enabled. Time period δt1, which is the time interval from time t1 to time t2, is typically about one to two seconds, and is selected so that radiant heat source 204 is not providing any measurable contribution to the heat energy detected by pyrometer 475.

Thus, the output signal on line 476 from pyrometer 475 to temperature measurement controller 490 also is gated so that the output signal on line 476 is selectively processed by temperature measurement controller 490. The output signal from pyrometer 475 is sampled over time interval δTmeas that extends from time t2 to time t3. In one embodiment, time interval δTmeas is selected to be approximately equal to the time required for susceptor 201 to make one revolution and is typically in the range of a few seconds and in another embodiment, time interval δTmeas is typically in the range of one to five seconds, but could be as large as 20 seconds. Power to radiant heat source 204 is off, or alternatively reduced from the normal processing power level, during measurement time interval δTmeas. In yet another embodiment, time interval δTmeas is selected so that the temperature is measured across only one substrate in a plurality of substrates supported by the susceptor.

For the configuration illustrated in FIG. 4A, there can be no contribution from heat source 204, either direct or reflected, because the power to heat source 204 is off when the measurement is made. Consequently, the need to correct the pyrometer measurement for contributions from radiant heat source 204 has been eliminated.

Further, the measurement is controlled so that only radiation from substrates 410A and 410B is detected by pyrometer 475. This can be done either by configuring the geometry so that only substrates are in the field of view of pyrometer 475 during the measurement, or alternatively using electronics to process the pyrometer output signal so that only the contribution from a substrate is measured, e.g., starting the measurement based on a flag on the susceptor and timing the measurement relative to that flag.

At time t4, switch 483 is closed and power is reapplied to heat source 204, i.e., the power is readjusted to the normal level for substrate processing. The relationship between times t3 and t4 is not critical. The important aspect is the selection of window Tw and measurement window δTmeas. Also, the temperature measurement is repeated from one to ten times a minute.

FIG. 4C is an illustration of an alternative embodiment, where only a single substrate is processed in a batch. The configuration and operation of the reactor in FIG. 4C is the same as in FIG. 4A except substrate is always in the field of view of pyrometer 475. Thus, consideration of the time period when susceptor is within in the field of view of pyrometer 475 is not of concern.

In yet another embodiment, a plurality of fiber optic cables, e.g., five fiber optic cables 460-1 to 460-5 (FIG. 4D), extend through radiant heat source 204 so that the radiant heat energy emitted from a substrate, or substrates, in each of five locations within reactor 400 is measured using the principles of this invention. Preferably, the fiber optic cables do not extend into the reaction chamber. The number of locations is selected so that an accurate mapping of the temperature distribution across reactor 400 is obtained so as to allow accurate control of that distribution.

The radiant energy incident on fiber optic cable 460-1 is transmitted through cable 460-1 to pyrometer 475. In this embodiment, a single pyrometer is used and moved so that a measurement is made from each fiber optic cable. Alternatively, pyrometer 475 can be moved to only selected fiber optic cables. Also, an individual pyrometer could be used with each fiber optic cable, or an individual pyrometer could be used for each of a first set of the fiber optic cables and a movable pyrometer used with other fiber optic cables. The particular choice is dependent upon the cost and the particular process or processes performed in the reactor.

The principles of this invention are directly applicable to other semiconductor and substrate processing reactors where an accurate temperature measurement is required. In each application, power to the heat source is controlled so that only energy radiated from the substrate or substrates is measured during the temperature measurement window. Alternatively, a shutter mechanism can be used to obtain equivalent results.

Figure 1A:
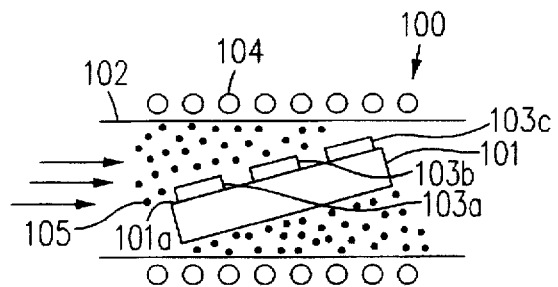
FIG. 1A is a simplified cross-sectional view of a prior art deposition reactor, known as a horizontal furnace, in which a susceptor is positioned in horizontal tube.
Figure 1B:
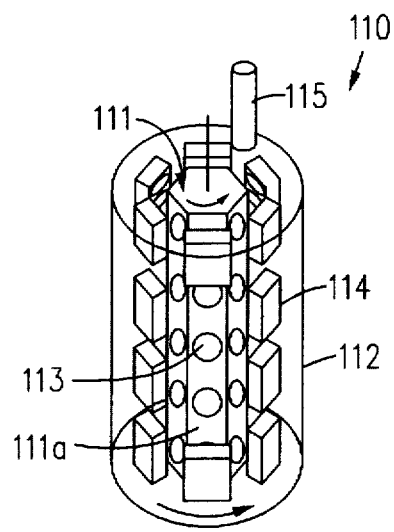
FIG. 1B is a simplified orthogonal view of another type of prior art reactor, known as a barrel reactor, in which a susceptor is suspended in the interior of a bell jar which defines the reaction chamber.
Figure 1C:
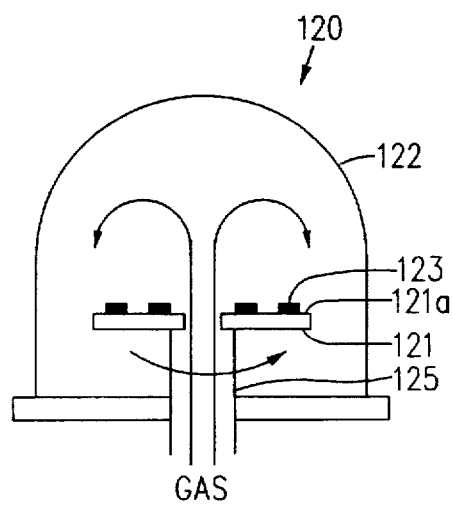
FIG. 1C is a simplified cross-sectional view of yet another type of prior art conventional chemical vapor deposition reactor, known as a pancake reactor, in which a vertically fixed susceptor is supported from the bottom of bell jar which defines the reaction chamber.
Figure 2A:
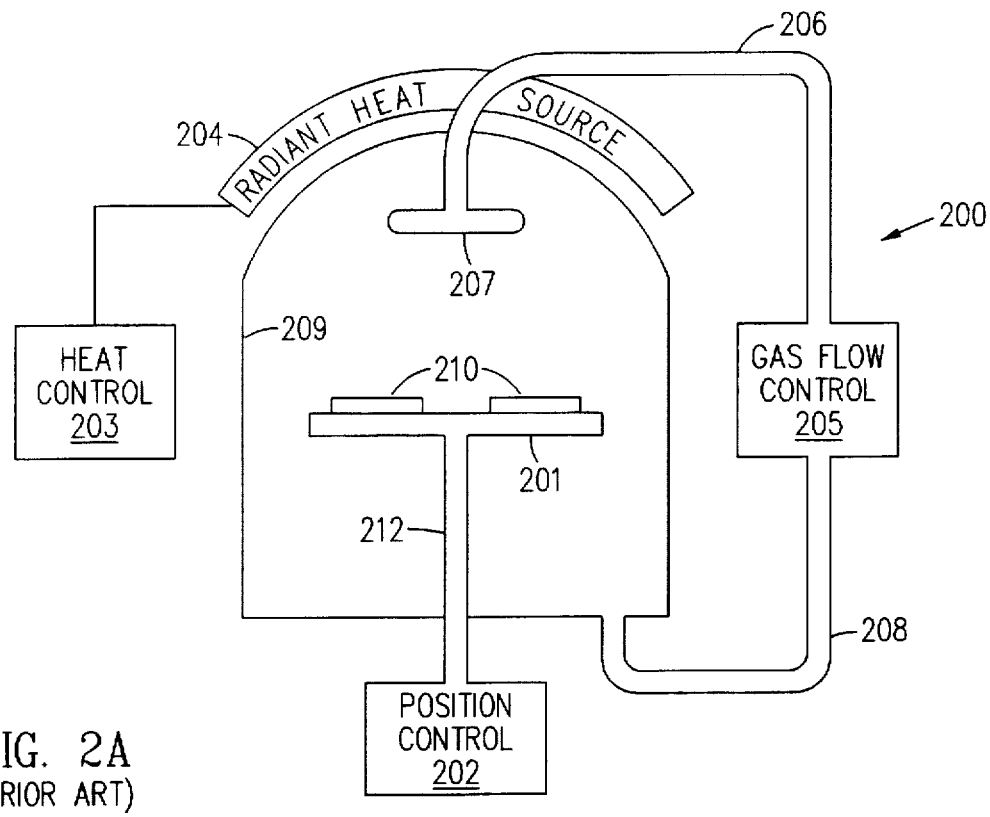
FIG. 2A is a simplified diagram of one prior art rapid thermal process reactor that uses a radiant heat source.
Figure 2B:
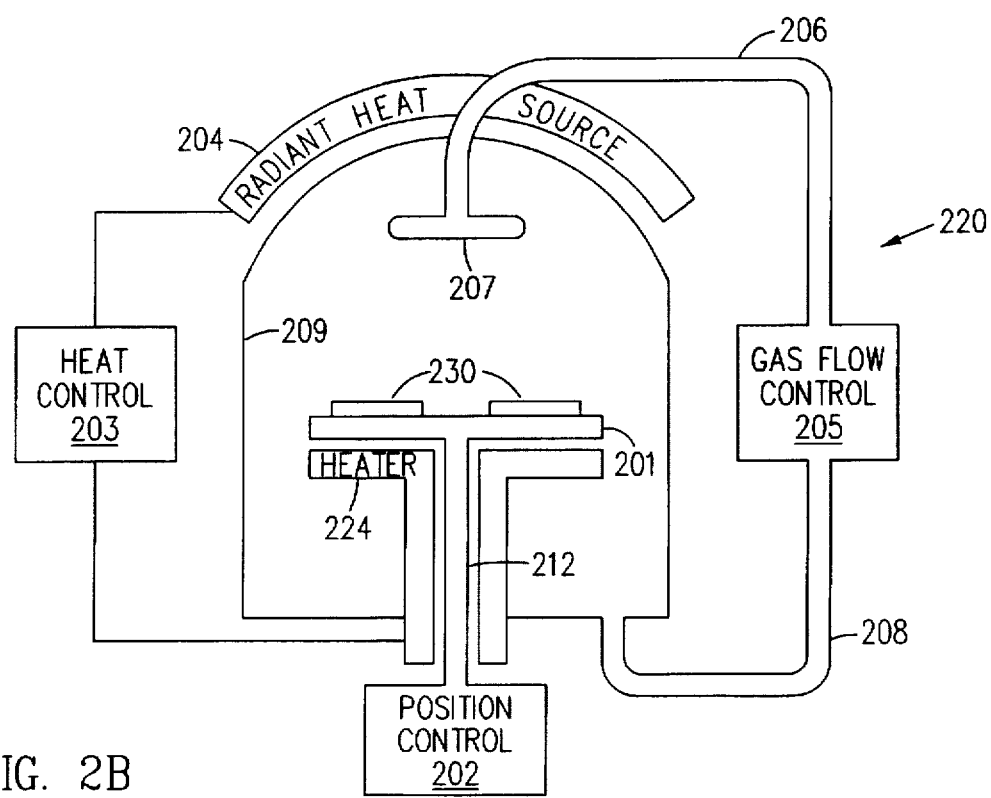
FIG. 2B is a simplified diagram of another prior art rapid thermal process reactor that uses a radiant heat source.
Figure 3:
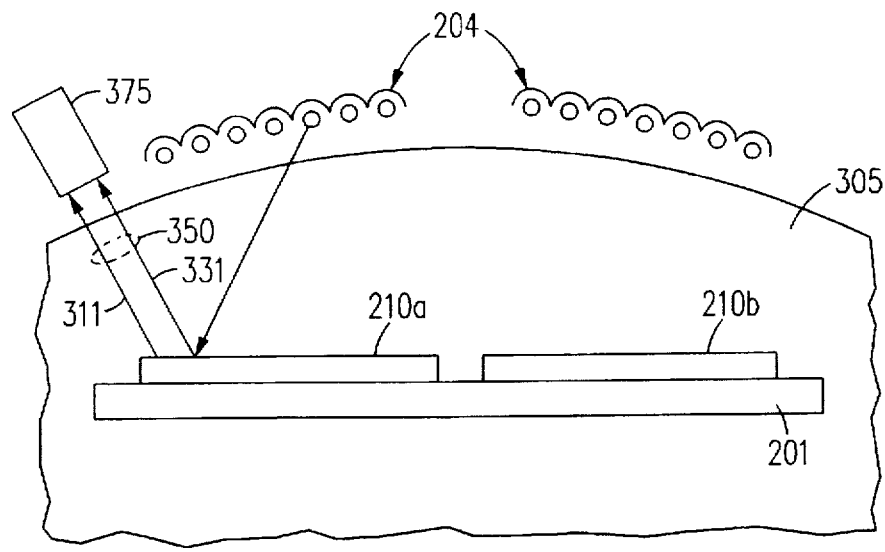
FIG. 3 is illustrates components of the heat energy in a prior art substrate temperature measurement.
Figure 5:
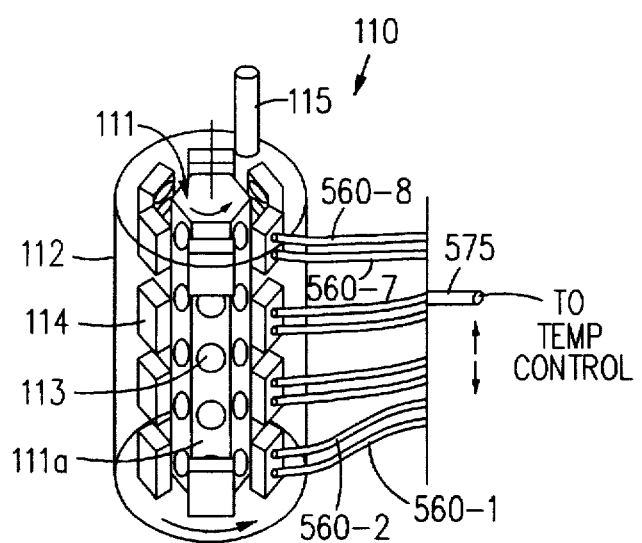
FIG. 5 is a simplified diagram of a barrel reactor in which an embodiment of the novel substrate temperature method of this invention is implemented.

The method of this invention is particularly advantageous for radiant heated barrel reactors similar to those illustrated in FIG. 1B. In reactor 110, (FIG. 5) a first end (not shown) of a fiber optic cable 560-6 is located to capture radiation emitted by a substrate in reactor 110 and transport the radiation to a pyrometer 575 at a second end of fiber optic cable 560-6. Pyrometer 575 measures the emitted radiation and generates a signal indicative of the temperature of the substrate in the area viewed by the first end of fiber optic cable 560-6. The measured temperature is used in controlling the power supplied to the heat zone associated with fiber optic cable 560-6. Since reactor 110 has a plurality of heat zones, typically, at least one fiber optic cable in a plurality of fiber optic cables 506-1 to 560-8 is located in each heat zone and pyrometer 575 is moved from cable to cable.

One RTP reactor suitable for use with this invention is described in copending and commonly assigned U.S. patent application Ser. No. 08/185,691 entitled "A RAPID THERMAL PROCESSING APPARATUS FOR PROCESSING SEMICONDUCTOR WAFERS," of Gary M. Moore, and Katsuhito Nishikawa filed on Jan. 21, 1994, now U.S. Pat. No. 5,683,518 and in U.S. patent application Ser. No. 08/007,981 entitled "A RAPID THERMAL PROCESSING APPARATUS FOR PROCESSING SEMICONDUCTOR WAFERS," of Gary M. Moore and Katsuhito Nishikawa filed on Jan. 21, 1993, now U.S. Pat. No. 5,444,217, both of which are incorporated herein by reference in their entirety.

The specific embodiment of the method for measuring substrate temperature is illustrative of the principles of this invention and is not intended to limit the invention to the particular features or dimensions described. In view of this disclosure, those of skill in the art will be able to implement the method in a wide variety of ways.

We claim:

1. A method for measuring a substrate temperature in a heated substrate processing reactor comprising:
    applying power to a heat source of said heated substrate processing reactor wherein a substrate in said heated process reactor is heated;

eliminating, from heat energy detected by a heat energy measuring device for a predefined time period during processing of said substrate, substantially all heat energy from said heat source; and measuring heat energy from said substrate during at least a portion of said predefined time period with said heat energy measuring device to determine a temperature of said substrate.

2. A method for measuring a substrate temperature in a heated substrate processing reactor as in claim 1 wherein said eliminating substantially all heat energy from said heat source further comprises:

terminating power to said heat source for said predefined time period during processing of said substrate.

3. A method for measuring a substrate temperature in a heated substrate processing reactor as in claim 2 further comprising:

reapplying power to said heat source upon completion of said predefined time period.

4. A method for measuring a substrate temperature in a heated substrate processing reactor as in claim 1 wherein said eliminating substantially all heat energy from said heat source further comprises:

reducing power to said heat source for said predefined time period during processing of said substrate.

5. A method for measuring a substrate temperature in a heated substrate processing reactor as in claim 4 further comprising:

reapplying power to said heat source upon completion of said predefined time period.

6. A method for measuring a substrate temperature in a heated substrate processing reactor as in claim 1 wherein said measuring heat energy radiated by said substrate further comprises using a fiber optic cable to transport heat energy radiated by said substrate to a pyrometer.

7. A method for measuring a substrate temperature in a heated substrate processing reactor as in claim 1 wherein said heated substrate processing reactor is a rapid thermal process reactor.

8. A method for measuring a substrate temperature in a heated substrate processing reactor as in claim 1 wherein said heated substrate processing reactor is a barrel reactor.

9. A method for measuring a substrate temperature in a heated substrate processing reactor as in claim 1 wherein said heated substrate processing reactor processes a batch of substrates simultaneously.

10. A method for measuring a substrate temperature in a heated substrate processing reactor as in claim 1 wherein said heated substrate processing reactor processes a batch comprising a single substrate.

11. A method for measuring a substrate temperature in a heated substrate processing reactor as in claim 1 wherein said applying power to a heat source of said heated substrate processing reactor further comprises powering a radiant energy heat source in said heated substrate processing reactor.

12. A method for measuring a substrate temperature in a heated substrate processing reactor as in claim 11 wherein said heated substrate processing reactor is a rapid thermal process reactor.

13. A method for measuring a substrate temperature in a heated substrate processing reactor as in claim 11 wherein said heated substrate processing reactor is a barrel reactor.

14. A method for measuring a substrate temperature in a heated substrate processing reactor as in claim 11 wherein said heated substrate processing reactor processes a batch of substrates simultaneously.

15. A method for measuring a substrate temperature in a heated substrate processing reactor as in claim 11 wherein said heated substrate processing reactor processes a batch comprising a single substrate.

16. A method for measuring a substrate temperature in a heated substrate processing reactor comprising:

applying power to a heat source of said heated substrate processing reactor wherein a substrate in said heated process reactor is heated;

controlling, during a predefined time period, heat energy incident on a heat energy measuring device to select heat energy from said substrate wherein said predefined time period is a fraction of a time that said substrate is heated; and measuring heat energy from said substrate during at least a portion of said predefined time period with said heat energy measuring device to determine a temperature of said substrate.

17. A method for measuring a substrate temperature in a heated substrate processing reactor as in claim 16 wherein said controlling, during a predefined time period, heat energy incident on a heat energy measuring device to select heat energy from said substrate further comprises:

terminating power to said heat source for said predefined time period during processing of said substrate.

18. A method for measuring a substrate temperature in a heated substrate processing reactor as in claim 17 further comprising:

reapplying power to said heat source upon completion of said predefined time period.

19. A method for measuring a substrate temperature in a heated substrate processing reactor as in claim 16 wherein said controlling, during a predefined time period, heat energy incident on a heat energy measuring device to select heat energy from said substrate further comprises:

reducing power to said heat source for said predefined time period during processing of said substrate.

20. A method for measuring a substrate temperature in a heated substrate processing reactor as in claim 16 wherein measuring heat energy radiated by said substrate further comprises using a fiber optic cable to transport heat energy radiated by said substrate to a pyrometer.

21. A method for measuring a substrate temperature in a heated substrate processing reactor comprising:

applying power to a heat source of said heated substrate processing reactor wherein a substrate in said heated process reactor is heated and radiates heat energy;

terminating power to said heat source for a predefined time period during processing of said substrate;

measuring heat energy radiated by said substrate during at least a portion of said predefined time period to determine a temperature of said substrate; and reapplying power to said heat source upon completion of said predefined time period.

22. A method for measuring a substrate temperature in a heated substrate processing reactor as in claim 21 wherein said applying power to a heat source of said heated substrate processing reactor further comprises powering a radiant energy heat source in said heated substrate processing reactor.

23. A method for measuring a substrate temperature in a heated substrate processing reactor as in claim 22 wherein said heated substrate processing reactor comprises a rapid thermal process reactor.

24. A method for measuring a substrate temperature in a heated substrate processing reactor as in claim 22 wherein said heated substrate processing reactor comprises a barrel reactor.

25. A method for measuring a substrate temperature in a heated substrate processing reactor as in claim 21 further comprising repeating each of said terminating, measuring, and reapplying operations to measure the temperature of said substrate a second time.

26. A method for measuring a substrate temperature in a heated substrate processing reactor as in claim 21 wherein said measuring heat energy radiated by said substrate further comprises using a fiber optic cable to transport heat energy radiated by said substrate to a pyrometer.

27. A method for measuring a substrate temperature during processing of said substrate in a heated substrate processing reactor comprising:

adjusting power to a heat source of said heated substrate processing reactor from a first operating level to a second predefined level at a time t1 wherein said second predefined level is less than said first operating level;

measuring heat energy radiated by a substrate within said heated substrate processing reactor starting at a time t2, where time t2 occurs after time t1, and ending at a time t3;

adjusting said power to said heat source to said first level at time t4 wherein time t4 is equal to or greater than time t3 wherein said power adjusting and measuring operations are performed during processing of said substrate; and a time window between time t1 and t4 is selected so that processing of said substrate is substantially unaffected by said operations, and said time window is a fraction of a time that said substrate is heated.

28. A method for measuring a substrate temperature in a heated substrate processing reactor as in claim 27 wherein said applying power to a heat source of said heated substrate processing reactor further comprises powering a radiant energy heat source in said heated substrate processing reactor.

29. A method for measuring a substrate temperature in a heated substrate processing reactor as in claim 28 wherein said heated substrate processing reactor is a rapid thermal process reactor.

30. A method for measuring a substrate temperature in a heated substrate processing reactor as in claim 28 wherein said heated substrate processing reactor further comprises a barrel reactor.

* * * * *